US008862916B2

(12) United States Patent
Lee et al.

(10) Patent No.: US 8,862,916 B2
(45) Date of Patent: Oct. 14, 2014

(54) WIRELESS CONTROL OF POWER SOCKETS BASED ON HOST AND SIGNAL QUALITY

(75) Inventors: Yu-Lung Lee, New Taipei (TW); Tsung-Chih Lin, New Taipei (TW)

(73) Assignee: Powertech Industrial Co., Ltd., New Taipei (TW)

( * ) Notice: Subject to any disclaimer, the term of this patent is extended or adjusted under 35 U.S.C. 154(b) by 166 days.

(21) Appl. No.: 13/244,330

(22) Filed: Sep. 24, 2011

(65) Prior Publication Data

US 2012/0297217 A1 Nov. 22, 2012

(30) Foreign Application Priority Data

May 20, 2011 (TW) .............................. 100117815 A

(51) Int. Cl.
  *G06F 1/26* (2006.01)
  *G06F 1/32* (2006.01)
(52) U.S. Cl.
  CPC .............. *G06F 1/266* (2013.01); *G06F 1/3206* (2013.01); *G06F 2200/261* (2013.01)
  USPC ....................................................... 713/320
(58) Field of Classification Search
  CPC .. G06F 1/266; G06F 2200/261; G06F 1/3206
  USPC ........................................................ 713/320
  See application file for complete search history.

(56) References Cited

U.S. PATENT DOCUMENTS

| 7,994,654 | B2 * | 8/2011 | Lee et al. ........................ 307/39 |
| 2009/0125743 | A1 * | 5/2009 | Robertson et al. ............ 713/324 |
| 2010/0044195 | A1 * | 2/2010 | Chiang et al. ................. 200/175 |
| 2010/0164284 | A1 * | 7/2010 | Lee et al. ........................ 307/38 |
| 2010/0231043 | A1 * | 9/2010 | Hu .................................. 307/39 |
| 2011/0083022 | A1 * | 4/2011 | Lai ................................. 713/300 |
| 2011/0175711 | A1 * | 7/2011 | Kuo et al. ................... 340/12.32 |

* cited by examiner

*Primary Examiner* — Thomas Lee
*Assistant Examiner* — Danny Chan
(74) *Attorney, Agent, or Firm* — Li & Cai Intellectual Property (USA) Office

(57) ABSTRACT

The present disclosure illustrates a power controller adapted for controlling the operation of a power socket. The power controller includes a first signal transmission interface and a first micro-control unit. The first signal transmission interface receives power control flow data and a mode signal for the peripheral devices of a host computer. The first micro-control unit outputs a control signal in accordance with the received periphery power control flow data and the received mode signal from a host computer. Further, the first micro-control unit through the communication established between a first communication unit and the second communication unit of the power socket outputs a control signal to the power socket, in order to control the power socket to power or not to power the peripheral devices after a predetermined time delay.

10 Claims, 8 Drawing Sheets

WIRELESS CONTROL OF POWER SOCKETS BASED ON HOST AND SIGNAL QUALITY

BACKGROUND

1. Technical Field

The present disclosure relates to a power control device, in particular, to a controllable power socket or a power control device with power-saving capability.

2. Description of Related Art

As the technology progresses, usage of electronic devices has been becoming part of people's daily lives. With more and more electronic devices available, conventional power sockets could be insufficient in number of sockets thereof, necessitating additional usage of extension socket sets.

In practice, without another extension socket set the extension socket set that are in connection with electronic devices are often placed in the vicinity of a power source such as city power. Also, when the peripheral devices are disconnected from the extension socket set the extension socket set may not be turned off, squandering more energy and thus deviating from the trend of power saving in view of the natural resource for the energy generation has been gradually exhausted.

SUMMARY

An exemplary embodiment of the present disclosure therefore provides a power controller, a power control device, and a power-saving method of a power control device. The method may have the host computer configure periphery power flow, reducing unnecessary power consumptions associated with peripheral devices.

An exemplary embodiment of the present disclosure provides a power controller, adapted for controlling operations of a power socket. The power controller including a first signal transmission interface connected to a second signal transmission interface of a host computer and a first micro-control unit coupled to the first signal transmission interface. The first signal transmission interface may be used for receiving a periphery power control flow data and a mode signal. In one implementation, the mode signal is either a working mode signal or a non-working mode signal. The first micro-control unit outputs a control signal according to the periphery power control flow data and the mode signal.

And the first micro-control unit through establishing communications between a first communication unit and a second communication unit of the power socket transmits the control signal to the power socket. When the received mode signal that is the working mode signal has been received, the power socket may be configured to power the plugged electronic peripheral devices after a predetermined time delay. Similarly, when the mode signal is the non-working mode signal the power socket may thus stop powering the peripheral devices after the predetermined time delay.

According to one exemplary embodiment of the present disclosure, a power control device includes a power controller and a power socket. The power socket includes a second communication unit, a second micro-control unit, a power switching unit, a timing output unit, and a full-time output unit. The second communication unit communicates with a first communication unit, the power switching unit is coupled between an input power interface and a timing output unit, the second micro-control unit is coupled to the second communication unit and the power switching unit, and the timing output unit may be configured to receive the peripheral devices. The second micro-control unit receives the control signal through the second communication unit and controls the power switching unit to be turned on or turned off according to the received control signal. In doing so, the second micro-control unit may control the timing output unit to output or not to output power from the input power interface when the predetermined time delay has been reached.

Another exemplary embodiment of the present disclosure provides a power-saving method for a power control device, adapted for managing the electricity supply to peripheral devices of a host computer. The power control device includes a power controller connected to the host computer and a power socket for powering the peripheral devices. The power-saving method includes the host computer first executing software application program stored in the power controller, interfacing human operators by displaying the user interface on the display unit of the host computer allowing for the human operator to configure the periphery power control flow, the host computer storing the configured the periphery power control flow data in the power controller, and the power controller determining whether or not the host computer operates in the working mode according to the outputted mode signal from the host computer. When the host computer operates in the non-working mode, then the power controller outputs the control signal to the power socket and causes the power socket not to power the peripheral devices.

The power controller, a power control device, and a power-saving method of a power control devices illustrated in aforementioned embodiments of the present disclosure may control operations of a controllable power socket in accordance with various operation modes of the host computer.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
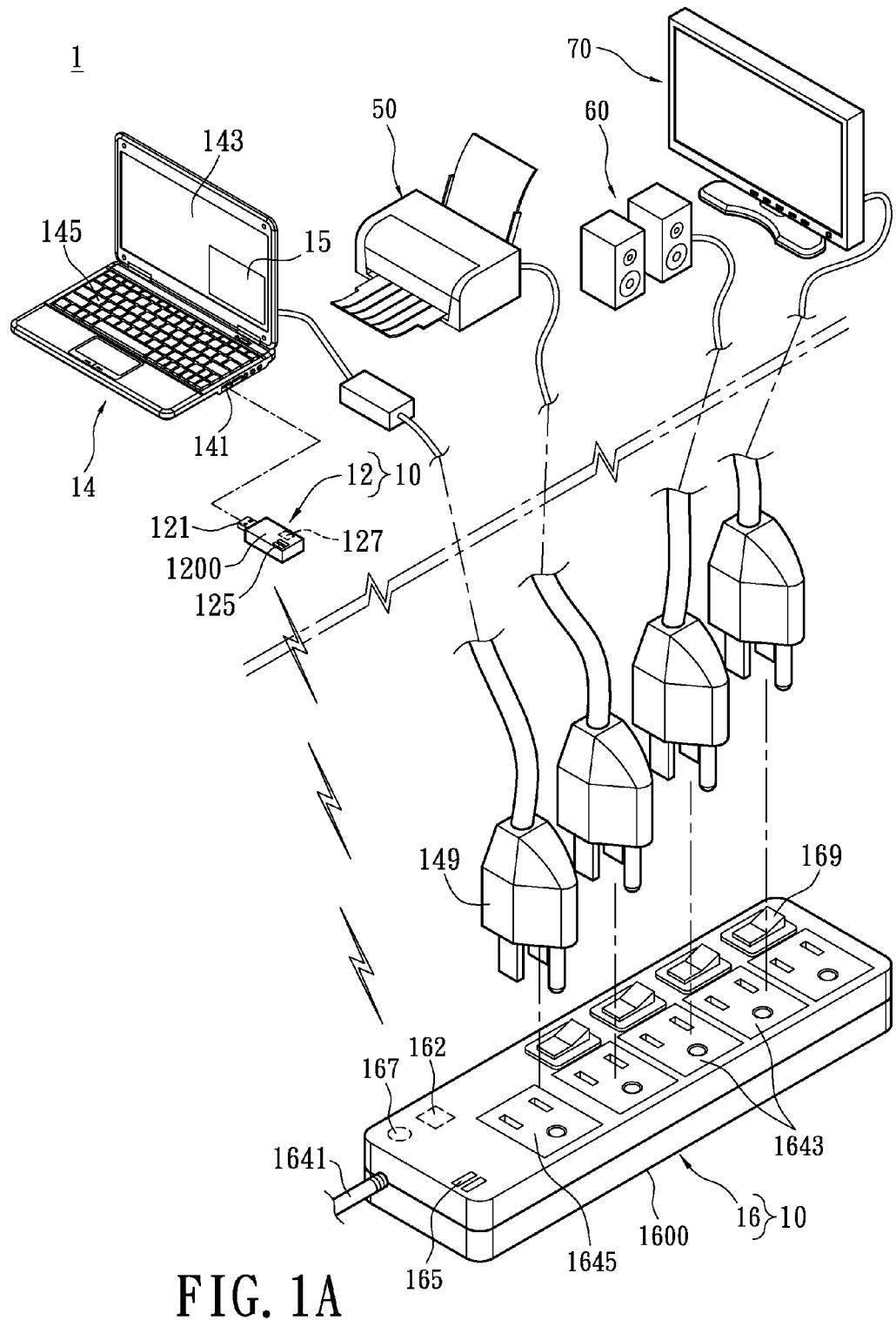
FIG. 1A is a schematic diagram of a power management system in accordance with the first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

(First Embodiment)

Please refer to FIG. 1A, which illustrates a schematic diagram of a power management system in accordance with the first exemplary embodiment of the present disclosure. As shown in FIG. 1A, a power management system 1 includes a power control device 10 and a host computer 14.

The power control device 10 includes a power controller 12 and a power socket 16. The power controller 12 is connected to the host computer 14 and the power socket 16 may receive peripheral devices 50, 60, and 70 of the host computer 14. When connected to the power socket 16 or establishing connection with the power socket 16, the peripheral devices 50, 60, and 70 may be powered. Further, operations of the power socket 16 are controlled by the power controller 12.

The host computer 14 may provide human operators with options of configuring the periphery power control flow in accordance with usage requirements of the peripheral devices 50, 60, and 70. Specifically, the host computer 14 may control the power socket 16 so that the power socket 16 may thus power or not to power the peripheral devices 50, 60, and 70 depending on operation modes of the host computer 14. The power controller 12, which may control operations of the power socket 16 in accordance to the operation mode of the host computer 14 and the received periphery power control flow data, may effectively minimize power consumption associated with the peripheral devices 50, 60, and 70 when the peripheral devices 50, 60, and 70 are idled.

The host computer 14 may download built-in software application programs of the power controller 12 and execute the same, allowing for the human operators to configure predetermined time delays, which may be utilized as the basis of either having the power socket 16 powered or not. For instance, the power socket 16 may be configured to power the connected peripheral devices 50, 60, and 70 5 minutes after the operating system has been running in the host computer 14. In another implementation, the power socket 16 may be configured not to power the peripheral devices 50, 60, and 70 10 minutes after the host computer 14 has been in hibernation.

The host computer 14 may include a second signal transmission interface 141, a display unit 143, an input unit 145, and an input power terminal 149. The input power terminal 149 may be plugged directly into a wall jack or an extension socket in order to receive the city power. The display unit 143 may be used for displaying a user interface 15. The input unit 145 may be used for receiving configurations inputted by the human operators for setting up the periphery power control flow. The second signal transmission interface 141 may receive the power controller 12, establishing signal transmission between the power controller 12 and the host computer 14.

The host computer 14 may have two operation modes including a working mode and a non-working mode. The non-working mode in one implementation may be defined in accordance with advanced configurations and power interface (ACPI) specifications. For instance, the host computer 14 may be in the non-working mode when operating in the hibernation or the soft off state.

In general, the operation mode of the host computer 14 may be monitored by a built-in mode monitoring unit (not shown in the figures). The mode monitoring unit may determine which operation mode the host computer 14 is in and output an operation mode signal through detecting an output current or an output voltage from a power supplying unit of the host computer 14. More specifically, when the mode monitoring unit detects that the output current, the output voltage, or an output power of the power supply unit is lower than a predetermined threshold the mode monitoring unit may output a non-working mode signal to indicate the host computer 14 operates in the non-working mode. Otherwise, the mode monitoring unit may output a working mode signal to indicate the host computer 14 operates in the working mode.

The mode monitoring unit may be an Embedded Controller (EC), and may have General Purpose Input/Output (GPIO) pins thereof connected to the second communication interface 141. A first signal transmission interface 121 of the power controller 12 may connect to the second signal transmission interface 141 in a pluggable manner. When the first signal transmission interface 121 of the power controller 12 connects to the second signal transmission interface 141 of the host computer 14, the host computer 14 may initially poll types of the power controller 12 in order to determine the types of the power controller 12. Further, after determining the types of the power controller 12 the host computer 14 may execute the software application program stored in the power controller 12.

After the periphery power control flow has been configured, the power controller 12 may receive information signal from the host computer 14. The information signal may include the mode signal and periphery power control flow data associated with the periphery power control flow. The power controller 12 may control the operations of the power socket 16 in accordance with the operation mode of the host computer 14 and the periphery power control flow data. The host computer 14 may also utilize the power controller 12 to monitor electricity usage of the power socket 16. The electricity usage in one implementation may include the power consumption and/or carbon emission of the peripheral devices 50, 60, and 70.

The display unit 143 may be a Liquid Crystal Display (LCD) monitor and the input unit 145 may be a physical keyboard. The display unit 143 may be integrated with the input unit 145. The second signal transmission interface 141 may be a USB (Universal Serial Bus) interface, SATA interface, or RS-232-based signal transmission interface. It is worth noting that the input power terminal 149 may be a corded plug.

The power controller 12 may further include a main body 1200, the first signal transmission interface 121 installed inside the main body 1200, a first indication unit 125, and a first communication unit 127 installed inside or outside the main body 1200. The first signal transmission interface 121 may be connecting to the second signal transmission interface 141 in a pluggable manner. When the first transmission interface 121 and the second signal transmission interface 141 is in connection, the transmission of power signal and information signal between the power controller 12 and the host computer 14 may be facilitated. The information signal may include the mode signal and the periphery power control flow data.

The power controller 12 may output a control signal according to the periphery power control flow data and the mode signal. When the mode signal are the working mode signal and the non-working mode signal, the control signal may be indicative of when the power socket 16 should be powered and when the power socket 16 would be no longer powered, respectively. More specifically, the control signal may include predetermined time delay information including a predetermined time delay which is indicative of when the power socket 16 should be powered and when the power socket 16 would no longer be powered.

The power controller 12 may output the control signal through the first communication unit 127 to the power socket 16, in order to control the operations of the power socket 16. The first indication unit 125 may be used to display signal transmission quality of the first communication unit 127 and/or the types of the mode signal.

The power controller 12 may be implemented in terms of a 2.4G USB wireless transmitter, a storage module, or a multimedia module. The first communication unit 127 may be an antenna. The first signal transmission interface 121 may be a USB interface, a SATA interface, or a RS-232-based transmission interface. The first indication unit 125 may be an indication light or a display. In one implementation, the first indication unit 125 may utilize a plurality of lights to represent the signal transmission quality or depict the type of the mode signal when being implemented in terms of a display screen.

The power socket 16 includes a housing unit 1600, a counter unit 162 installed inside the housing unit 1600, and an input power interface 1641 installed on an upper body of the housing unit, a timing output unit 1643, a full-time output unit 1645, a second indication unit 165, a second communication unit 167, and an operation unit 169.

The timing output unit 1643 may be configured to accommodate the peripheral devices 50, 60, and 70 therein and enable the peripheral devices 50, 60, and 70 to receive the power from the input power interface 1641. The second communication unit 167 receives the control signal from the power controller 12 and the power socket 16 further controls the operations of the timing output unit 1643 according to the control signal. The full-time output unit 1645 on the other hand is always "on." The power socket 16 may through the second communication unit 167 output the electricity usage information over a predetermined period of time received from the timing output unit 1643 and the full-time output unit 1645 to the power controller 12. Further, the host computer 14 may therefore download the electricity usage information for user to reference.

The electricity socket 16 may control the operations of the timing output unit 1643 according to the operation of the counter unit 162, which is adapted for counting the aforementioned predetermined time delay. In other words, when the predetermined time delay has been reached (or the counter unit 162 has finished the counting of the predetermined time delay) the operations of the timing output unit 1643 (e.g., powered or not powered) may vary. The operation unit 169 may be configured to regulate the operations of the timing output unit 1643 through external operations. For example, the operation unit 169 may be configured through manual operations to regulate the operations of the timing output unit 1643.

The second indication unit 165 may be an indication light or a display for outputting an indication signal in accordance to the signal transmission quality of the second communication unit 167 or the counting of the counter unit 162. For example, the second instruction unit 165 may utilize a plurality of lights to represent the signal transmission quality or through a screen display to depict the types of the control signal.

The power socket 16 may be an extension power socket, and the input power interface 1641 may be a corded plug. The timing output unit 1643 and the full-time output unit 1645 may be a two-prong or a three-prong AC socket. The timing output unit 1643 may include one or more sets of AC sockets with each controlled by the power controller 12. The operating unit 169 may be a physical switching key, a button or a touch-control switch.

Figure 1B:
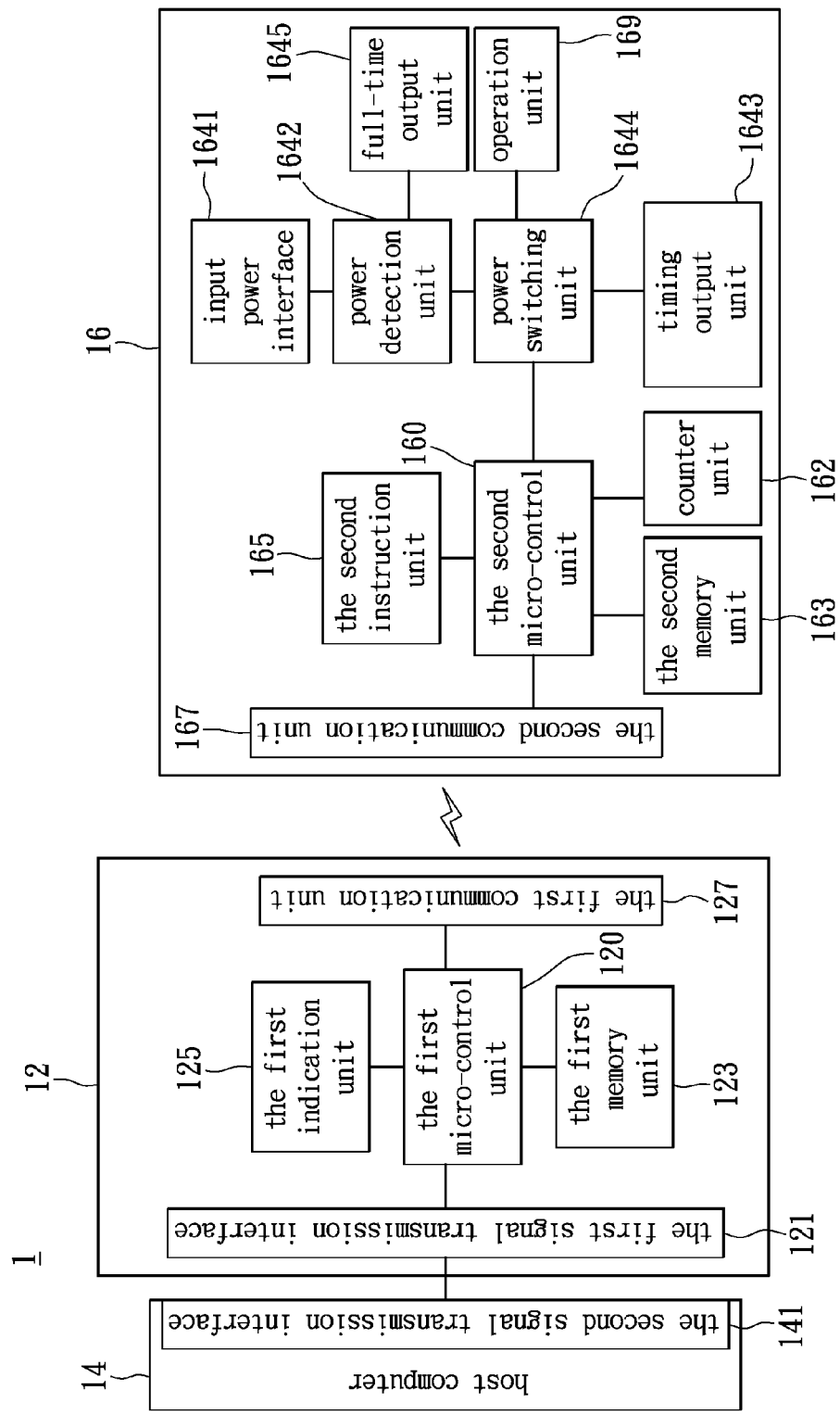
FIG. 1B is a function block diagram of a power management system in accordance with the first exemplary embodiment of the present disclosure.

Please refer to FIG. 1B, which illustrates a function block diagram of a power management system 1 in accordance with the first exemplary embodiment of the present disclosure. As shown in FIG. 1B, the power controller 12 includes a first micro-control unit 120 as well as the first signal transmission interface 121, a first memory unit 123, the first indication unit 125 and the first communication unit 127, all of which may be coupled to the first micro-control unit 120.

The power socket 16 may include a second micro-control unit 160, the counter unit 162, a second memory unit 163, the second indication unit 165, the second communication unit 167, the operation unit 169, the input power interface 1641, a power detection unit 1642, the timing output unit 1643, a power switching unit 1644, and the full-time output unit 1645. The counter unit 162, the second memory unit 163, the second instruction unit 165, the second communication unit 167 and the power switching unit 1644 may be coupled to the second micro-control unit 160. The power detection unit 1642, the timing output unit 1643, and the operation unit 169 meanwhile may be coupled to the power switching unit 1644, with the input power interface 1641 and the full-time output unit 1645 coupled to the power detection unit 1642.

The memory unit 123 may be adapted for storing a software application program related to the operations of the power socket 16 and the software application may be downloaded and executed by the host computer 14. Once executed by the host computer 14, the software application program may help facilitate the interfacing between the human operators and the host computer 14. The interfacing may include allowing for the human operators to receive the configurations of the periphery power control flow. As show in FIG. 1C, a user interface 15c may include a title bar 151, a main item list bar 153, a sub-item list bar 1531, a learning button 154, a status bar 155, a checkbox menu bar 156, a configuration menu bar 157, and an option button 158.

Figure 1C:
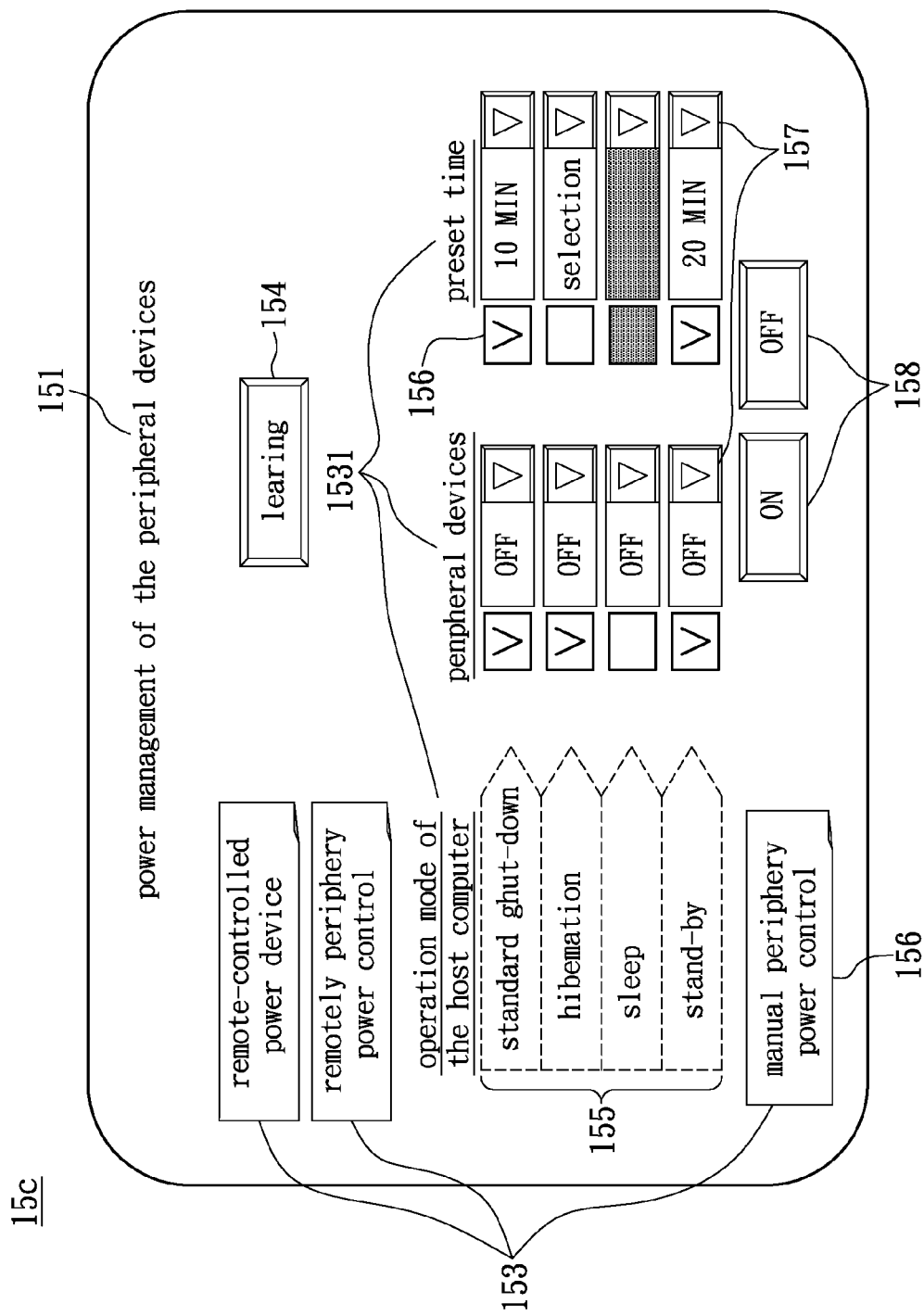
FIG. 1C is an exemplary diagram of a user interface for a power management system in accordance with an exemplary embodiment of the present disclosure.

As shown in FIG. 1C, the title bar 151 may display the power management of the peripheral devices and the main item list bar 153 may include columns for a power remote controller, a remotely-controlled periphery power control, and a manually controlled periphery power control. The learning button 154 is related to the remote pairing function of the power control device 10. The sub-item list bar 1531 may include rows for the operation mode of the host computer corresponding to the remotely-controlled periphery power control, the peripheral devices, and the predetermined time delay. Moreover, the option button 158 may provide the human operators with an option to activate the manually controlled periphery power control for the peripheral devices. The status bar 155 may display the operating status of the host computer. The number of checkbox menu bars 156 may correspond to the number of status bars 155, so that the periphery power control flow may vary and correspond to distinct operation mode of the host computer 14.

The configuration menu bar 157 may be used to configure the operations of the peripheral devices 50, 60, and 70. More specifically, the peripheral devices 50, 60, and 70 being turned on or off may vary in different operation modes of the host computer 14. Additionally, the configuration menu bar 157 may facilitate the configuration setting of the predetermined time delay for the peripheral devices 50, 60, and 70 at different operation modes of the host computer 14. Further, the configuration menu bar 157 may be a drop-down selection menu. Those skilled in the art should be able to deduce other methods to design the user interface 15c to achieve similar effects as the present disclosure.

The first communication unit 127 and the second communication unit 167 may exchange an identification code and an identification serial number with each other when the communication between the first communication unit 127 and the second communication unit 167 has been established. The identification code and the identification serial number of the power controller 12 may be stored in the first memory unit 123, while the identification code and the identification serial number of the power socket 16 may be stored in the second memory unit 163.

When the first micro-control unit 120 executes the software application program, the first micro-control unit 120 may determine whether the power controller 12 and the power socket 16 may be communicable. In one implementation through the first communication unit 127 the first micro-control unit 120 may transmit a linking signal to the power socket 16 and determine whether the identification code of the power socket 16 matches the predetermined identification code of the power controller 12 according to the response to the linking signal transmitted by the power socket 16. When the identification code of the power socket 16 matches the identification code of the power controller 12, the power controller 12 may communicate with the power socket 16.

When the power controller 12 and the power socket 16 may communicate with each other, the first micro-control unit 120 may further determine whether or not the power socket 16 is controllable by the power controller 12 by outputting the identification signal to power socket 16 and determines whether the identification serial number of the power socket 16 matches the predetermined identification serial number of the power controller 12 according to the response to the identification signal transmitted by the power socket 16. When the identification serial number of the power socket 16 matches the identification serial number of the power controller 12, the power socket 16 may thus be capable of recognizing the control signal transmitted by the power controller 12.

Figure 1D:
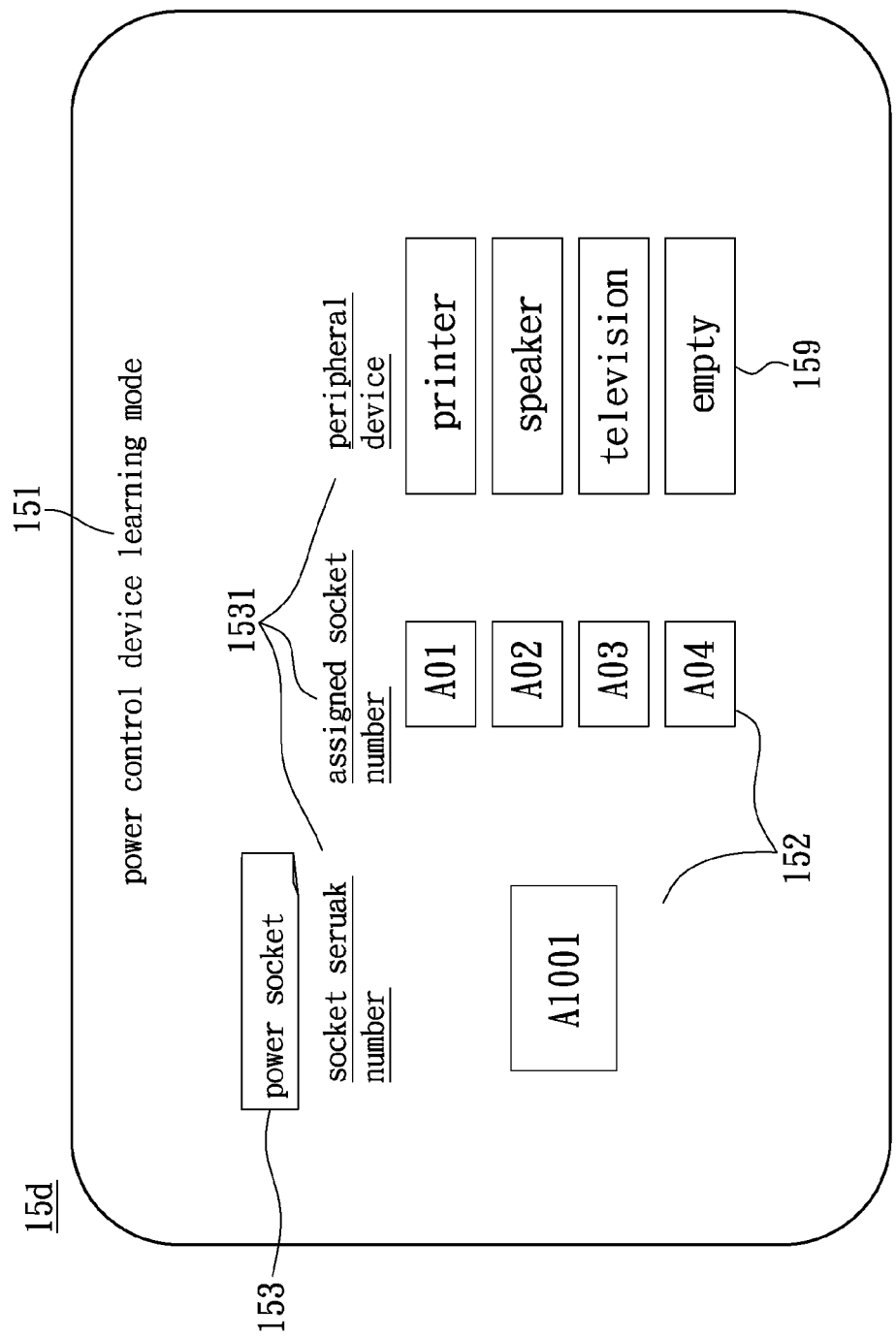
FIG. 1D is an exemplary diagram of a user interface for a power management system in accordance with an exemplary embodiment of the present disclosure.

However, if the identification serial number of the power socket 16 is different from the identification serial number of the power controller 12 the user interface 15c may prompt the human operator to conduct the corresponding pairing process between the power controller 12 and the power socket 16. For example, the learning button 154 may continue lighting or flashing to prompt the human operator to click the learning button 154 to have the first micro-control unit 120 to perform the remote paring learning process. Meanwhile, the user interface 15c may be switching to the learning mode user interface 15d shown in FIG. 1D. The learning mode user interface 15d may include a title bar 151, the main item list bar 153, the sub-item list bar 1531, the parameter bar 152, and the list of name bar 159. The title bar 151 may display the power control device learning mode. The main item list bar 153 may list the power sockets, and the sub-item list bar 1531 may display the serial numbers of the corresponding power sockets, assigned socket numbers, and peripheral devices. The parameter bar 152 may include parameters corresponding to the serial numbers of the power sockets and of the assigned socket numbers. In one implementation, the parameters corresponding to the serial numbers of the power sockets may serve as the identification serial number of the power socket 16 while parameters corresponding to the assigned socket numbers may serve to identify the timing output unit 1643 of the power socket 16. Further, the list of name bar 159 may display the inputted names of the peripheral devices, 50, 60, and 70.

After entering into the learning mode, the first micro-control unit 120 may output a learning signal to the power socket 16 to instruct the second micro-control unit 160 of the power socket 16 to store the identification serial number contained in the learning signal into the second storage unit 163. As such, the power socket 16 may become controllable by the power controller 12. At the completion of the learning process, the user interface may switch back to the user interface 15c shown in FIG. 1C and the periphery power control flow configurations may be accomplished.

Please refer back to FIG. 1B, the first micro-control unit 120 of the power controller 12 through the first signal transmission interface 121 may receive the periphery power control flow data and the mode signal from the host computer 14. The first micro-control unit 120 may further through the first communication unit 127 transmit the control signal to the second communication unit 167 of the power socket 16 according to the received periphery power control flow data and the mode signal. The control signal may be used to cause the power socket 16 to start powering the peripheral devices connected to the power socket 16 after the predetermined time delay counting from the host computer 14 operating in the working mode. The control signal, on the other hand, may also cause the power socket 16 to stop powering the peripheral devices once the host computer 14 has been operating in the non-working mode for the period of the predetermined time delay.

The first micro-control unit 120 may control the first indication unit 125 to output the indication signal corresponding to either the signal transmission quality or the mode signal.

The second micro-control unit 160 of the power socket 16 through the second communication unit 167 may receive the control signal, and the counter unit 162 may count the predetermined time delay contained in the control signal. The second micro-control unit 160 may control the operations of the power switching unit 1644 according to the counting of the counter unit 162. More specifically, when the control signal is the working mode signal, the second micro-control unit 160 may cause the power switching unit 1644 to be turned on after the counter unit 162 completes the counting of the predetermined time delay. Thus, the timing output unit 1643 and the input power interface 1641 may be turned on as well. When the control signal is the non-working mode signal, the second micro-control unit 160 may cause the power switching unit 1644 to be turned off after the counter unit 162 completes counting the predetermined time delay, turning off the timing output unit 1643 and the input power interface 1641 accordingly.

The power detection unit 1642 may be a voltage detection circuit or a current detection circuit. When the timing output unit 1643 and the input power interface 1641 are turned on, the power detection unit 1642 may detect the voltage, the current or the power parameters across the timing output unit 1643 and the input power interface 1641 (e.g., the first power). The second micro-control unit 160 may accumulate detection results of the power detection unit 1642, which may be considered as the electricity usage data, before storing the electricity usage data in the second memory unit 163. The second micro-control unit 160 may further through the second communication unit 167 transmit the electricity usage data to the power controller 12 for the host computer 14 to download so that the accumulated carbon emission of the peripheral devices during a specific time period may be obtained. In addition, the power detection unit 1642 may also detect the voltage, the current, or the power parameters across the input power interface 1641 and the full-time output unit 1645 (e.g., the second power).

Figure 1E:
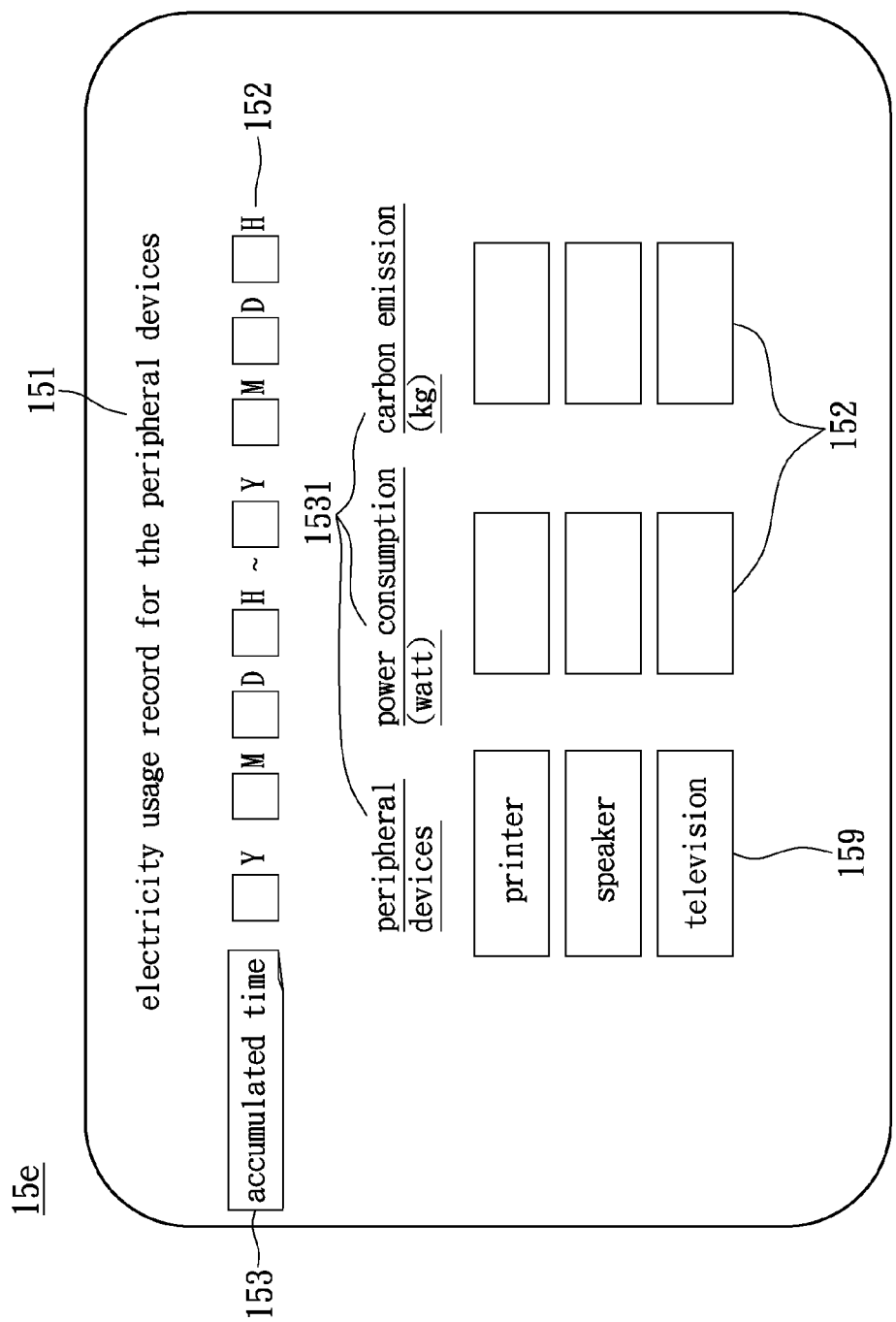
FIG. 1E is an exemplary diagram of a user interface for a power management system in accordance with an exemplary embodiment of the present disclosure.

The host computer 14 may through the display unit 143 display the accumulated carbon emission information of the peripheral devices 50, 60, and 70 during the predetermined time period. As shown in FIG. 1E, the title bar 151 on the user interface 15e may display the electricity usage record for peripheral devices. The main item list bar 153 may indicate the predetermined time period such as the length of the predetermined time period. The parameter bar 152 at the same time may further specify actual time/date/year information associated with the predetermined time period. The sub-item list bar 1531 may include columns for the peripheral devices, the corresponding power consumptions, and carbon emissions. The list of name bar 159 may display the names of the peripheral devices 50, 60, and 70 inputted by the human operator. The parameter bar 152 meanwhile may show the electricity consumed in watts and the carbon emission data in terms of the kilo-gram.

Please refer back to FIG. 1B, the second micro-control unit 160 controls the second indication unit 165 to output the corresponding indication signal according to the signal transmission quality of the second communication unit 167 or the counting of the counter unit 162. For instance, the second instruction unit 165 may utilize a plurality of the lights to indicate the signal transmission quality or the display device to specify the type of the control signal.

The operation unit 169 may receive manual inputs to control the operations of the power switching unit 1644 to further cause the timing output unit 1643 to be turned on or turned off, adding operation flexibility to the power socket 16.

(Second Embodiment)

Figure 2A:
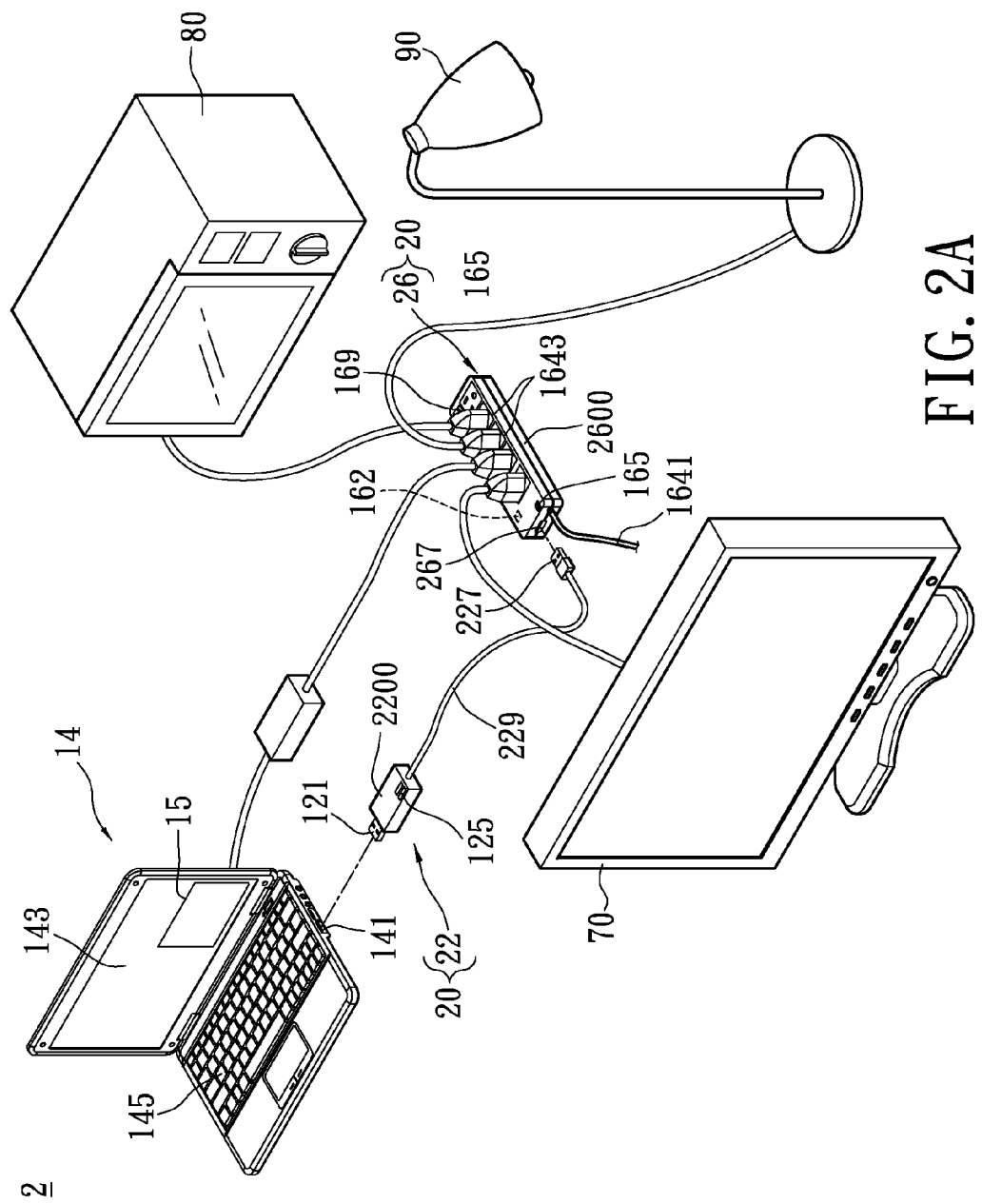
FIG. 2A is a schematic diagram of a power management system in accordance with the second exemplary embodiment of the present disclosure.

Please refer to 2A, which illustrates a schematic diagram of a power management system in accordance with the second exemplary embodiment of the present disclosure. The power management system 2 of FIG. 2 is approximately the same as the aforementioned power management system 1 of the first exemplary embodiment with the main difference being the power controller 22 of the power control device 20 is physically wired to the power socket 26. The power controller 22 includes a third communication unit 227, which may through a transmission line 229 connect to a main body 2200. A fourth communication unit 267 in the housing unit 2600 of the power socket 26 may be adapted adopted to physically receive the third communication unit 227. The power controller 22 and the power socket 26 thus may thereby establish communication through the third communication unit 227 and the fourth communication unit 267.

Furthermore, user may configure the periphery power control flow of the power socket 26 through the user interface 15 of the host computer 14. The power controller 22 may receive the periphery power control flow data and the mode signal and outputs the corresponding control signal to the power socket 26, in order to control the operations of the power socket 26, which may power or not to power the peripheral devices 70, 80, and 90.

Figure 2B:
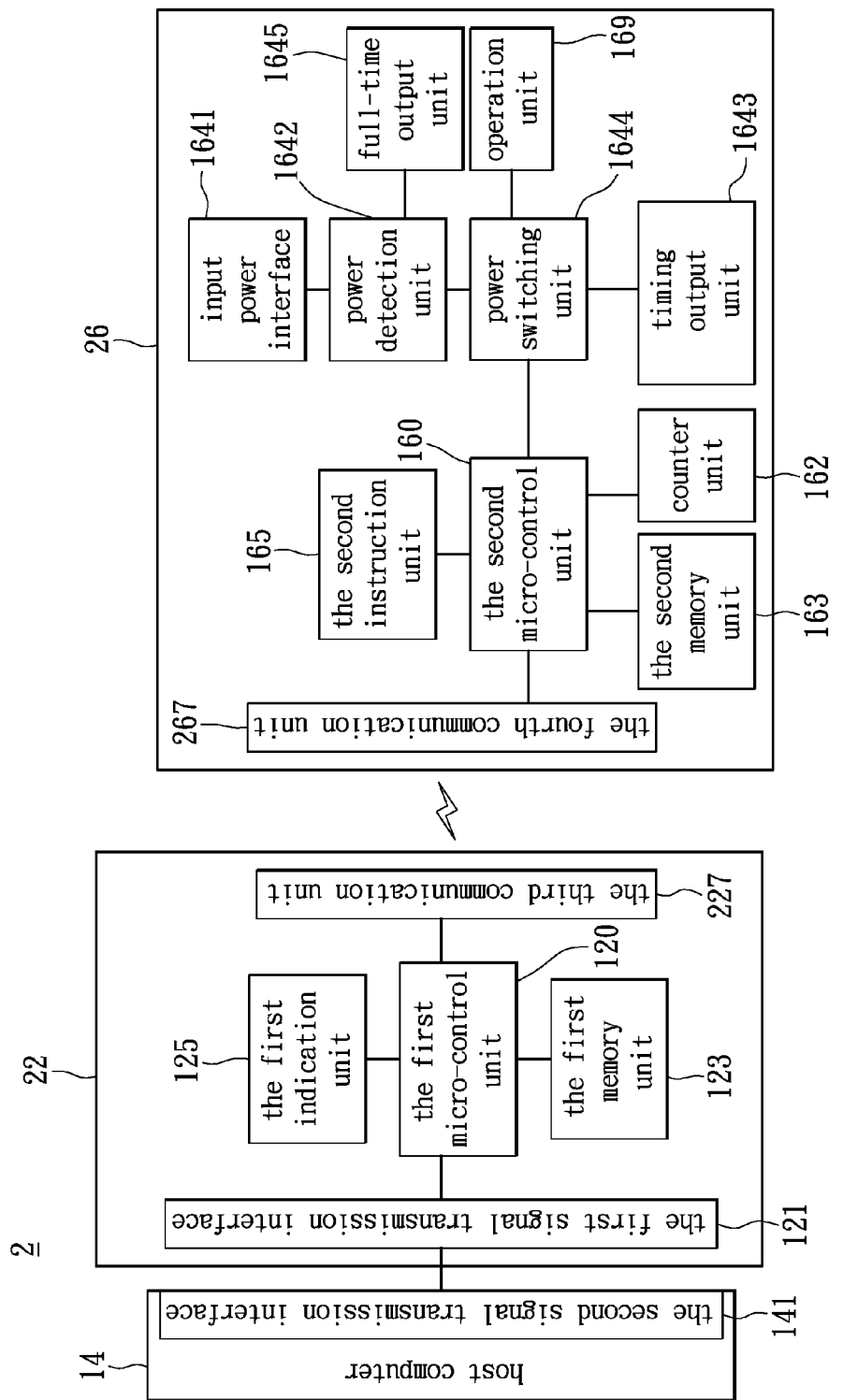
FIG. 2B is a function block diagram of a power management system in accordance with the second exemplary embodiment of the present disclosure.

Please refer to FIG. 2B, which depicts a function block diagram of a power management system 2 in accordance with the second exemplary embodiment of the present disclosure. The power management system 2 of FIG. 2B is approximately the same as the power management system 1 illustrated in FIG. 1B. The theory of operations between the power controller 22 and the power socket 26 are thereby essentially the same as the aforementioned first exemplary embodiment and further descriptions are therefore mitted.

Figure 3:
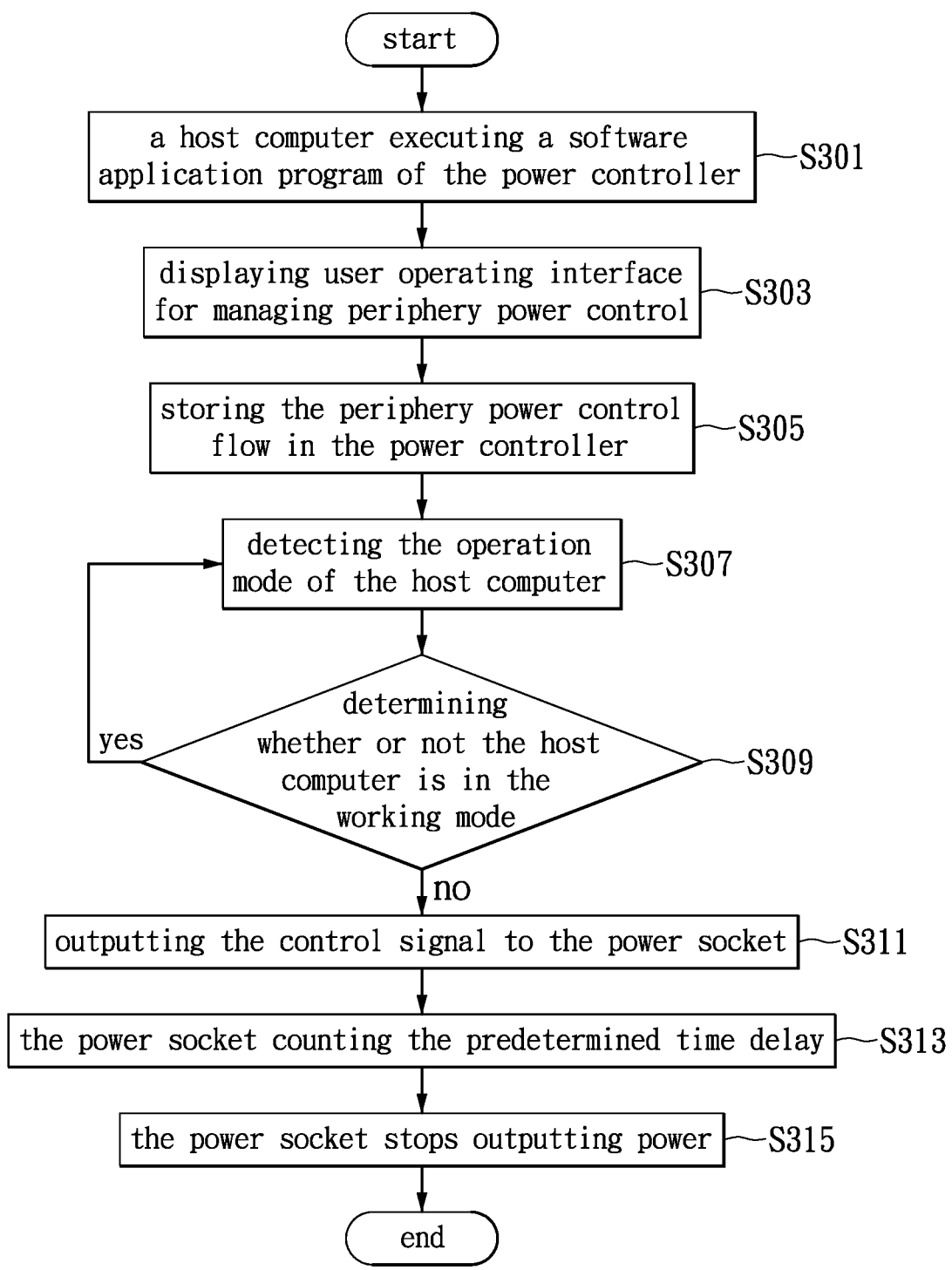
FIG. 3 is a flowchart diagram illustrates a power-saving method for a power management system in accordance with an exemplary embodiment of the present disclosure.

Lastly, please refer to FIG. 3 in conjunction with FIG. 1A. FIG. 3 describes a flowchart diagram illustrating a power-saving method for a power management system in accordance with an exemplary embodiment of the present disclosure. The power-saving method for power control device 10 includes the host computer 14 coupled to the power controller 12 executing the software application program (S301), wherein the software application program may be installed in the power controller 12 before the power controller is put into stream of the business or downloadable from web sites.

As the host computer 14 executing the software application program, the display unit 143 may display user interface 15 (S303), wherein the user interface 15 enabling the human operator to configure the periphery power control flow. Further, at the completion of the configuration for periphery power control flow, the host computer 14 may store the corresponding periphery power control flow data onto the power controller 12 (S305).

The power controller 12 upon receive of the mode signal send from the host computer 14 may detect current operation mode of the host computer 14 (S307). The mode signal is a working mode signal when the host computer 14 is executing the application program and the mode signal becomes a non-working mode signal when the host computer 14 has been idled for a period of time. The non-working mode signal may further include the hibernation mode signal and the sleep signal according to the length of idle period.

The power controller 12 may determine whether or not the host computer 14 is in the working mode according to the mode signal. (S309). When the power controller 12 determines that the host computer 14 operates in the working mode, the power controller 12 may continue detecting the present operation mode of the host computer 14. (S307)

The power controller 12 may output the control signal to the power socket 16, when determining the host computer 14 operates in the non-working mode (S311). The power socket 16 may first determines whether or not the timing output unit 1643 is powered, and if determines that the timing output unit 1643 is powered, the power socket 16 may start counting the predetermined time delay. (S313).

When finishing counting the predetermined time delay, the power socket 16 may control the timing output unit 1643 to stop supplying the power to the power socket 16 (S315).

Alternatively, the power socket 16 may receive a control signal outputted from the power controller 12, wherein the control signal corresponds to the operation mode of the host computer 14 and the power supply mode of the peripheral devices 50, 60, 70 associated with the host computer 14. The power socket may determine whether or not to power the peripheral devices 50, 60, and 70 associated with the host computer 14 according to the received control signal. And if the host computer 14 operates in a working mode, the power socket 16 start power the peripheral devices 50, 60, and 70 associated with the host computer 14 after the power socket 16 finishes counting a predetermined time delay. On the other hand, if the host computer 14 operates in a non-working mode, the power socket 16 stops the peripheral devices 50, 60, and 70 associated with the host computer 14 from being powered after the power socket 16 finishes counting the predetermined time delay.

In summary, the aforementioned power controller, power control device, and power-saving method of the power control device disclosed in the present disclosure can through adopting simplified configuration techniques, delay the operations of the power socket of powering (or not powering) the peripheral devices, thereby reducing the standby power consumptions of the peripheral devices. The power controller of the present disclosure may use the remote learning ability to perform automatically pairing, hence the power controller can further reports the electricity usage information of the peripheral devices, allowing for the human operators to constantly monitor the power consumption and the carbon emission status of peripheral devices.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A power control device, comprising:
    a power controller, comprising:
        a first signal transmission interface, connected to a second signal transmission interface of a host computer, for receiving a periphery power control flow data and a mode signal from the host computer, wherein the mode signal is either a working signal or a non-working signal;
        a first communication unit;
        a first micro-control unit electrically coupled to the first signal transmission interface and the first communication unit, for outputting a control signal according to the periphery power control flow data and the mode signal, for communicating with a second communication unit of a power socket through the first communication unit to wirelessly transmit the control signal to the power socket, wherein the first communication unit and the second communication unit are antennas, and the first communication unit is disposed in the power controller while the second communication unit is disposed in the power socket; and
        a first indication unit, used to display signal transmission quality of the first communication unit and/or types of the mode signal;
        wherein when the mode signal is the working mode signal, the control signal is a start powering signal, and when the mode signal is the non-working signal, the control signal is a stop powering signal, which is configured to stop the power socket from being powered after a predetermined time delay; and
    the power socket, comprising:
        the second communication unit, for wirelessly communicating with the first communication unit for receiving the control signal;
        a second micro-control unit, electrically coupled to the second communication unit;
        a power switching unit, electrically coupled to the second micro-control unit;
        a timing output unit;
        a full-time output unit, wherein the power switching unit is electrically coupled between an input power interface and the timing output unit, the second micro-control unit is further electrically coupled to the power switching unit, the timing output unit allows for insertion of the peripheral devices, and the second micro-control unit receiving the control signal through the second communication unit, the second micro-control unit controls operations of the power switching unit before controlling the timing output unit to output a first power from the input power interface, and wherein the timing output unit is configured to stop outputting the power to the peripheral devices associated with the host computer from the input power interface after the predetermined time delay; and
        a second indication unit, for outputting an indication signal in accordance to signal transmission quality of the second communication unit or a counting of a counter unit.

2. The power control device according to claim 1, wherein when the mode signal is the working mode signal and the control signal is the start powering signal, the power socket is powered after the predetermined time delay.

3. The power control device according to claim 1, wherein the power controller further comprising:
    a first memory unit electrically coupled to the first micro-control unit, the first memory unit storing a software application program, the host computer interfacing with human operators while executing the software application program, and allowing for the human operators to configure a periphery power control flow, wherein the periphery power control flow comprises associating different sets of the predetermined time delay with operation modes of the host computer, and storing electricity usage information having accumulated carbon emission information and accumulated electricity usage over a predetermined period of time on the first memory unit by the first communication unit.

4. The power control device according to claim 3, wherein the power controller further comprising an user interface adopted for displaying console windows related to periphery power control management, power control device learning mode or peripheral device record, wherein the user interface further comprises a status bar corresponding to the operating mode of the host computer and a configuration menu bar enabling the human operator to control operations of peripheral devices connected to the power socket and to select or adjust the predetermined time delay depending on the operation modes of the host computer.

5. The power control device according to claim 4, wherein the user interface further comprises a learning and selection button, wherein the learning button is for enabling the power controller to perform a remote pairing learning process, and the selection button is adopted for providing the human operator with capability to activate or deactivate a manual control of the powering socket, and wherein when the remote learning button is selected, the host computer outputs a learning signal to the power socket, which is configured to store an identification serial number of the power controller.

6. A power socket, adapted for determining whether or not to power the corresponding peripheral devices associated with a host computer according to a control signal outputted from a power controller, the power controller comprising a first communication unit and a first micro-control unit, the power socket comprising:
    a second communication unit, for wirelessly communicating with the first communication unit;
    a second micro-control unit, electrically coupled to the second communication unit;
    a power switching unit, electrically coupled to the second micro-control unit;
    a timing output unit;
    a full-time output unit, wherein the power switching unit is electrically coupled between an input power interface and the timing output unit, the second micro-control unit is further electrically coupled to the power switching unit, the power switching unit allows for insertion of the peripheral devices, and upon receiving the control signal through the second communication unit the second micro-control unit controls operations of the power switching unit before controlling the timing output unit to output a first power from the input power interface, and wherein the timing output unit is configured to stop outputting the power to the peripheral devices associated with the host computer from the input power interface after the predetermined time delay; and a second indication unit, for outputting an indication signal in accordance to signal transmission quality of the second communication unit or a counting of a counter unit;

wherein, the first communication unit and the second communication unit are antennas, and the first communication unit is disposed in the power controller while the second communication unit is disposed in the power socket.

7. The power socket according to claim 6, wherein the power switching unit is configured to output the power to the peripheral devices associated with the host computer after the predetermined time delay.

8. The power socket according to claim 6, wherein the power socket further comprises a counter unit electrically coupled to the second micro-control unit, the second micro-control unit controls the counter unit to count the predetermined time delay when the second micro-control unit receives the control signal, the power socket further comprises an indication unit electrically coupled to the second micro-control unit, which controls the indication unit to output a corresponding indication signal according to a counting result of the counter unit.

9. The power socket according to claim 6, wherein the power socket further comprises a power detection unit electrically coupled between the input power interface and the timing output unit and the power detection unit is further coupled between the input power interface and the full-time output unit, wherein the power detection unit is for detecting the first power across the input power interface and the timing output unit as well as a second power across the input power interface and the full-time output unit, and the second micro-control unit calculates the accumulated electricity usage on basis of the power detection unit detecting the first power and the second power within the predetermined period of time and outputs the accumulated electricity usage through the second communication interface transmits to the power controller.

10. A power-saving method for a power control device capable of regulating an electricity usage of peripheral devices of a host computer having a display unit, wherein the power control device comprises a power controller connected to the host computer and a power socket for powering the peripheral devices associated with the host computer, comprising:

the power socket having a second communication unit wirelessly receiving a control signal outputted from a first communication unit disposed in the power controller, wherein the control signal corresponds to the operation mode of the host computer and the power supply mode of the peripheral devices associated with the host computer;

the power socket determining whether or not to power the peripheral devices associated with the host computer according to the received control signal;

if the host computer operating in a working mode, the power socket begin to power the peripheral devices associated with the host computer after the power socket finishes counting a predetermined time delay; and if the host computer operating in a non-working mode, the power socket stopping the peripheral devices associated with the host computer from being powered after the power socket finishes counting the predetermined time delay;

wherein, the first communication unit and the second communication unit are antennas;

wherein, the power controller further comprises a first indication unit used to display signal transmission quality of the first communication unit and/or types of the mode signal, and the power socket further comprises a second indication unit configured for outputting an indication signal in accordance to signal transmission quality of the second communication unit or a counting of a counter unit.

* * * * *